(12) United States Patent
Otani et al.

(10) Patent No.: US 11,770,491 B2
(45) Date of Patent: Sep. 26, 2023

(54) IMAGE PROCESSING DEVICE, IMAGE PROCESSING METHOD, AND STORAGE MEDIUM

(71) Applicant: CANON KABUSHIKI KAISHA, Tokyo (JP)

(72) Inventors: Ryosuke Otani, Tokyo (JP); Hisashi Ishikawa, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/735,388

(22) Filed: May 3, 2022

(65) Prior Publication Data

US 2022/0263974 A1 Aug. 18, 2022

Related U.S. Application Data

(63) Continuation of application No. PCT/JP2020/031940, filed on Aug. 25, 2020.

(30) Foreign Application Priority Data

Nov. 7, 2019 (JP) ................................. 2019-202683

(51) Int. Cl.
*H04N 1/405* (2006.01)
*G06K 15/02* (2006.01)

(52) U.S. Cl.
CPC ....... *H04N 1/4051* (2013.01); *G06K 15/1877* (2013.01); *H04N 1/4055* (2013.01)

(58) Field of Classification Search
CPC .... H04N 1/4051; H04N 1/4055; H04N 1/405; G06K 15/1877
See application file for complete search history.

(56) References Cited

U.S. PATENT DOCUMENTS 7,924,464 B2 * 4/2011 Kakutani ............... H04N 1/405
358/3.16
7,957,031 B2 * 6/2011 Kakutani ........... H04N 1/40087
358/3.16
(Continued)

FOREIGN PATENT DOCUMENTS

EP 2963908 B1 * 10/2020 ......... G06K 15/1822
JP H09-238259 A 9/1997
(Continued)

OTHER PUBLICATIONS

International Search Report issued by the Japan Patent Office dated Oct. 20, 2020 in corresponding International Application No. PCT/JP2020/031940, with English translation.

*Primary Examiner* — Ted W Barnes
(74) *Attorney, Agent, or Firm* — Carter, DeLuca & Farrell LLP

(57) ABSTRACT

A quantized value for a pixel of interest in an input image is derived by using a predetermined threshold value matrix. Then, based on a pixel value group in a predetermined reference area including the pixel of interest in the input image and a threshold value group corresponding thereto, directionality of correction is determined. Further, based on the pixel value group and the threshold value group, whether or not the pixel of interest satisfies a predetermined condition for changing the quantized value is determined. Then, based on both the determination results, the quantized value is corrected.

16 Claims, 8 Drawing Sheets

(56) References Cited

U.S. PATENT DOCUMENTS

| | | |
|---|---|---|
| 9,201,839 B2 | 12/2015 | Hara et al. |
| 9,462,091 B2 | 10/2016 | Hara et al. |
| 9,485,388 B2 | 11/2016 | Kodama et al. |
| 9,690,228 B2 * | 6/2017 | Otani .................. H04N 1/00 |
| 9,734,439 B2 | 8/2017 | Hara et al. |
| 9,749,496 B2 | 8/2017 | Fujimoto et al. |
| 10,027,848 B2 | 7/2018 | Fuse et al. |
| 10,043,118 B2 * | 8/2018 | Sumi .................. G06K 15/1822 |
| 10,057,459 B2 | 8/2018 | Yamamoto et al. |
| 10,063,743 B2 | 8/2018 | Fuse et al. |
| 10,073,370 B2 | 9/2018 | Takikawa et al. |
| 10,187,553 B2 | 1/2019 | Takesue et al. |
| 10,194,053 B2 | 1/2019 | Otani et al. |
| 10,356,282 B2 | 7/2019 | Ochiai et al. |
| 10,545,446 B2 | 1/2020 | Takikawa et al. |
| 10,733,488 B2 | 8/2020 | Takesue et al. |
| 10,831,121 B2 | 11/2020 | Yanai et al. |
| 10,834,288 B2 | 11/2020 | Hashioka et al. |
| 10,855,877 B2 | 12/2020 | Takesue et al. |
| 10,896,358 B2 | 1/2021 | Kikuta et al. |
| 11,020,985 B2 | 6/2021 | Otani et al. |
| 11,090,946 B2 | 8/2021 | Otani et al. |
| 11,104,151 B2 | 8/2021 | Ochiai et al. |
| 11,192,386 B2 | 12/2021 | Ochiai et al. |
| 11,281,950 B2 | 3/2022 | Otani et al. |
| 11,321,596 B2 | 5/2022 | Takesue et al. |
| 2011/0122451 A1 * | 5/2011 | Tsutsumi ............... H04N 1/405 358/3.06 |
| 2012/0026554 A1 * | 2/2012 | Genda .................. H04N 1/4055 358/3.27 |
| 2013/0010314 A1 * | 1/2013 | Ishikawa ............... H04N 1/4055 358/1.9 |
| 2014/0376056 A1 * | 12/2014 | Fujimoto .............. H04N 1/405 358/3.06 |
| 2015/0371123 A1 * | 12/2015 | Kodama ............ G06K 15/1822 358/3.14 |
| 2017/0116502 A1 * | 4/2017 | Kodama ............... H04N 1/4051 |
| 2017/0310851 A1 * | 10/2017 | Dobashi ................ H04N 1/405 |
| 2017/0324885 A1 * | 11/2017 | Ochiai ................ G06K 15/1878 |
| 2019/0014232 A1 * | 1/2019 | Haruta .................. H04N 1/4055 |
| 2020/0349405 A1 | 11/2020 | Otani et al. |
| 2021/0155009 A1 | 5/2021 | Otani |
| 2021/0303950 A1 | 9/2021 | Takesue et al. |
| 2021/0303952 A1 | 9/2021 | Takesue et al. |
| 2022/0030136 A1 | 1/2022 | Moribe et al. |
| 2022/0222498 A1 | 7/2022 | Takesue et al. |
| 2022/0266603 A1 | 8/2022 | Otani |

FOREIGN PATENT DOCUMENTS

| | | |
|---|---|---|
| JP | 2013-078119 A | 4/2013 |
| JP | 2016-021735 A | 2/2016 |
| JP | 2017-103562 A | 6/2017 |

* cited by examiner

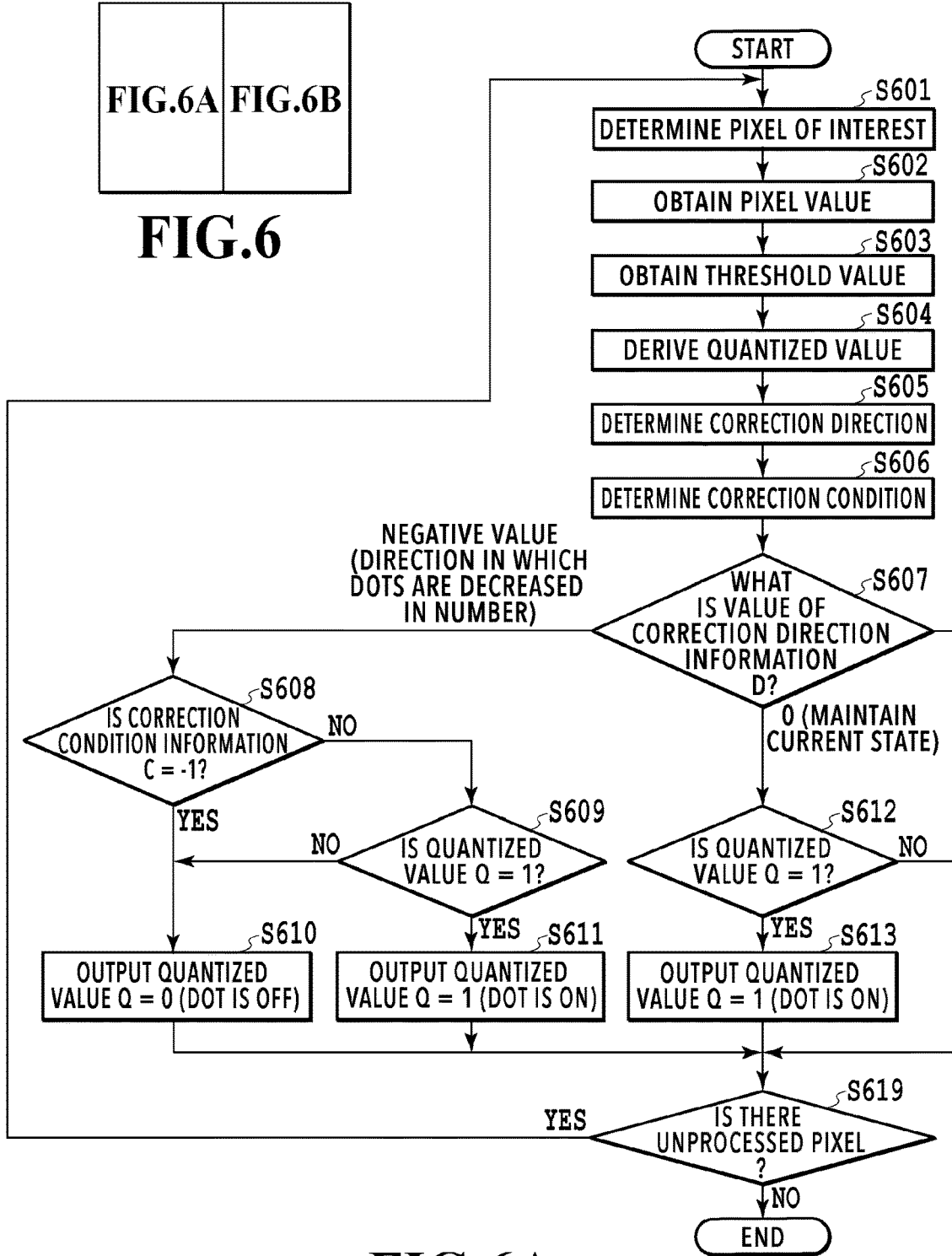

IMAGE PROCESSING DEVICE, IMAGE PROCESSING METHOD, AND STORAGE MEDIUM

CROSS-REFERENCE TO RELATED APPLICATIONS

This application is a Continuation of International Patent Application No. PCT/JP2020/031940, filed Aug. 25, 2020, which claims the benefit of Japanese Patent Application No. 2019-202683 filed Nov. 7, 2019, both of which are hereby incorporated by reference herein in their entirety.

BACKGROUND

Field

The present invention relates to an image processing technique to convert a digital image into a halftone image.

Background Art

A printer is widely utilized that prints an image on a printing medium, such as paper, by using printing materials, such as ink and toner, in accordance with a digital image generated in a computer or a digital camera. Generally, the pixel value of each pixel constituting a digital image is represented by multi-tone level, such as eight bits and 16 bits per color. On the other hand, in a printer, an image is formed by ON/OFF of a dot by a printing material. Because of this, it is frequent that the number of tones the printer can output is smaller than the number of tones of the digital image that is input. Consequently, in order to enable print processing in the printer, a halftone image representing the tones of the digital image in a pseudo manner by performing halftone processing for the digital image.

As one kind of halftone processing, there is processing called dither processing using a threshold value matrix. The threshold value matrix is a matrix in which the threshold value corresponding to each pixel of the digital image is arranged. The dither processing reduces the number of tones of the digital image by quantizing the pixel value of each pixel by comparing the pixel value and the corresponding threshold value for each pixel constituting the digital image. By repeatedly applying the threshold value matrix to the entire digital image in a tiling manner, the comparison processing with the threshold value is performed for all the pixels within the digital image.

The threshold value matrix that is used in the dither processing is roughly classified into two kinds. One kind is an FM (Frequency Modulation)-based threshold value matrix in which large and small threshold values are arranged in a dispersed manner and the other is an AM (Amplitude Modulation)-based threshold value matrix in which threshold values are arranged from a certain position in ascending order. The halftone image that is obtained by the dither processing using the FM-based threshold value matrix has a dot pattern of dispersed dots and the tone is represented in a pseudo manner by the number of dos per unit area. Further, the halftone image that is obtained by the dither processing using the AM-based threshold value matrix has a dot pattern in which dot groups are arranged periodically and the tone is represented in a pseudo manner by the area of the dot group. In each threshold value matrix, it is general that the arrangement of threshold values is determined by taking into consideration the output characteristic of the printer in a case where a so-called flat (uniform density) digital image is input.

There is a case where a halftone image representing a desired dot pattern is not obtained as a result of performing dither processing by applying the above-described threshold value matrix to the input digital image. For example, there is a case where the tone represented by the digital image is not reproduced in a partial area within the obtained halftone image, or a case where there is a break in a fine line that should be reproduced. This is caused by interference between the feature represented by the input digital image and the characteristic of the applied threshold value matrix.

As a technique to suppress the deterioration in image quality such as this, for example, there is a technique disclosed in Patent Document 1. In the technique of Patent Document 1, first, a difference between the input digital image and the halftone image obtained by performing halftone processing is found. Then, the moire component is extracted by performing the filter processing using a band-pass filter for the obtained difference. Further, a moire-removed signal is generated by performing weighted averaging of the tone signal in the input digital image and the low-frequency component signal in accordance with the extracted moire component. Then, by converting the moire-removed signal into a halftone-dot image signal, a halftone image in which the moire component is suppressed. is obtained.

CITATION LIST

Patent Literature

PTL 1: Japanese Patent Laid-Open No. H09-238259

SUMMARY OF THE INVENTION

By the method of Patent Document 1 described above, it is possible to suppress the occurrence of moire, but there is such a problem that in a partial area within the halftone image, the high-frequency component is lost. For example, in a case where the high-frequency component is lost from the edge portion whose density is medium, the contrast at the edge portion is reduced and becomes unclear and as a result of this, preferred print results are not obtained.

Consequently, an object of the technique of the present disclosure is to convert a digital image into a halftone image of a higher quality.

Means for Solving Problem

The image processing device according to the present disclosure is an image processing device that generates a halftone image by performing quantization processing for an input image and includes: a derivation unit configured to derive a quantized value corresponding to a pixel of interest in the input image by using a threshold value matrix; a first determination unit configured to perform determination relating to correction for the quantized value based on a pixel value group in the reference area including the pixel of interest in the input image and a threshold value group corresponding to the pixel value group in the threshold value matrix; a second determination unit configured to perform determination relating to whether or not the pixel of interest satisfies a predetermined condition for changing the quantized value based on the pixel value group and the threshold value group; and a correction unit configured to correct the quantized value based on determination results of the first determination unit and determination results of the second determination unit.

Advantageous Effect of the Invention

Further features of the present invention will become apparent from the following description of exemplary embodiments with reference to the attached drawings.

DESCRIPTION OF THE EMBODIMENTS

In the following, with reference to the attached drawings, preferred embodiments of the present invention are explained. The configuration shown in each following embodiment is merely exemplary and the technique of the present disclosure is not limited to the configurations shown schematically.

First Embodiment

Figure 1:
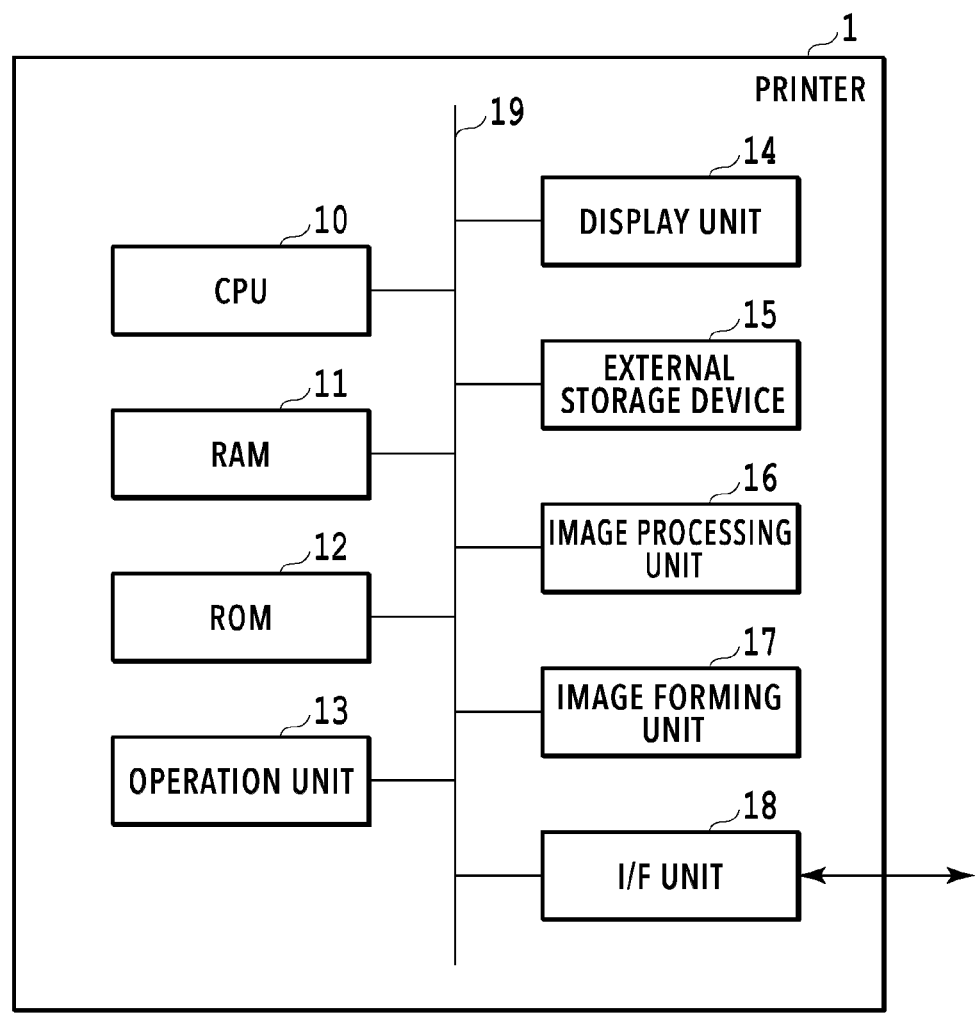
FIG. 1 is a block diagram showing a hardware configuration of an ink jet printer.

FIG. 1 is a block diagram showing the hardware configuration of an ink jet printer according to the present embodiment. A printer 1 comprises a CPU 10, a RAM 11, a ROM 12, an operation unit 13, a display unit 14, an external storage device 15, an image processing unit 16, an image forming unit 17, an I/F (interface) unit 18, and a bus 19. In the following, each unit is explained.

The CPU 10 controls the operation of the entire printer 1 by executing predetermined programs stored in the RAM and the ROM, to be described later, Here, explanation is given by taking a case as an example where the CPU 10 controls the entire device, but it may also be possible to control the entire device by dividing the processing and allocating each piece of processing to each of a plurality of pieces of hardware.

The RAM 11 temporarily stores programs and various kinds of data read from the external storage device 15 and various kinds of data received from the outside via the I/F unit 18. Further, the RAM 11 is used as a work memory for the CPU 101 and the image processing unit 16 to perform predetermined processing. The ROM 12 stores parameters to control the operation setting of each unit of the printer 1, boot programs and the like.

The operation unit 13 includes buttons, a keyboard, a mouse and the like, which are provided on the top surface of the casing of the printer 1 and receives user instructions via the operation by a user. By using these, a user inputs various necessary instructions to the CPU 10. The display unit 14 includes a CRT, a liquid crystal screen and the like and displays processing results by the CPU 10 by using images and characters. In a case where the display unit 14 is a touch panel capable of detecting a touch operation, the display unit 14 functions as part of the operation unit 13.

The external storage device 15 is a large-capacity information storage device represented by the HDD and SSD. In the external storage device 15, various programs including the OS, data of digital images input from a PC or the like, not shown schematically, and the like are stored. Further, the external storage device 15 stores temporary data (image data that is input/output, threshold value matrix used by the image processing unit 16, and the like) that is generated in a variety of pieces of processing. The programs and data stored in the external storage device 15 are read appropriately under the control of the CPU 10 and loaded onto the RAM 11 and executed and processed by the CPU 10.

Figure 2A:
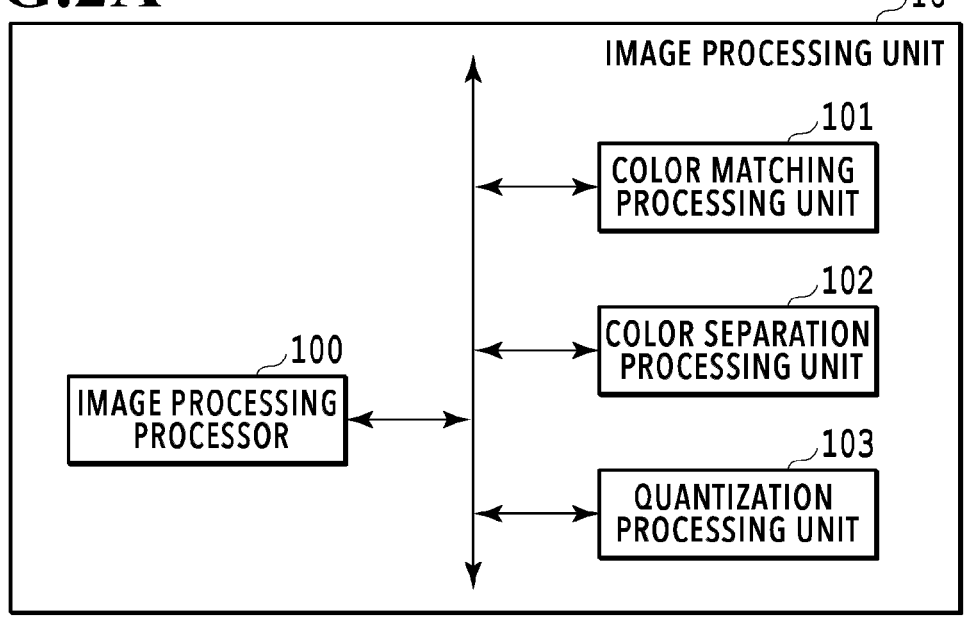
FIG. 2A is a block diagram showing an internal configuration of an image processing unit and FIG. 2B is a block diagram showing an internal configuration of a quantization processing unit.

The image processing unit 16 is an image processing controller including a processor capable of executing programs and a dedicated image processing circuit. The image processing unit 16 performs various kinds of image processing for converting digital image data that is input as a printing target into image data for printing, which the image forming unit 17 can output. FIG. 2A is a block diagram showing the internal configuration of the image processing unit 16. The image processing unit 16 has an image processing processor 100, a color matching processing unit 101, a color separation processing unit 102, and a quantization processing unit 103. The image processing processor 100 controls each processing unit based on predetermined programs. The color matching processing unit 101 converts the color signal (RGB signal) representing the color of each pixel in a printing-target multi-tone level input digital image into a device RGB signal in accordance with the color reproduction area of the image forming unit 17. The color separation processing unit 102 converts the device RGB signal into a CMYK signal corresponding to the colors (Cyan, Magenta. Yellow, Black) of the printing materials used by the image forming unit 17 based on a color separation table prepared in the ROM 2. The quantization processing unit 103 generates a halftone image by performing dither processing using the above-described threshold value matrix for the CMYK signal to convert the CMYK signal into a CMYK signal whose number of tones is smaller. The image processing unit 16 as an image processing controller may be an image processing device independent of the printer 1.

The image forming unit 17 forms an image by ejecting ink as the printing material onto a sheet from nozzles in accordance with the halftone image as an image for printing, which is received from the quantization processing unit 103. In the present embodiment, explanation is given by taking an ink jet printer as an example, but the printer may be an electrophotographic printer that forms an image by fixing toner onto a sheet and the image forming method is not limited particularly.

The I/F unit 18 functions as a communication interface for connecting the printer 1 and an external device, such as a PC. The printer 1 and an external device are connected via, for example, infrared, a wireless LAN, the internet and the like.

Each of the above-described units is connected to the bus 19 and performs transmission and reception of data via the bus 19. In the present embodiment, explanation is given by taking a case as an example where the image forming unit 17 performs full-color printing by using the printing materials of the four colors of CMYK, but it is also possible to apply the present embodiment similarly to a case where monochrome printing is performed using only the printing material of K or to a case where printing is performed using a particular color other than CMYK.

(Configuration of Quantization Processing Unit 103)

Figure 2B:
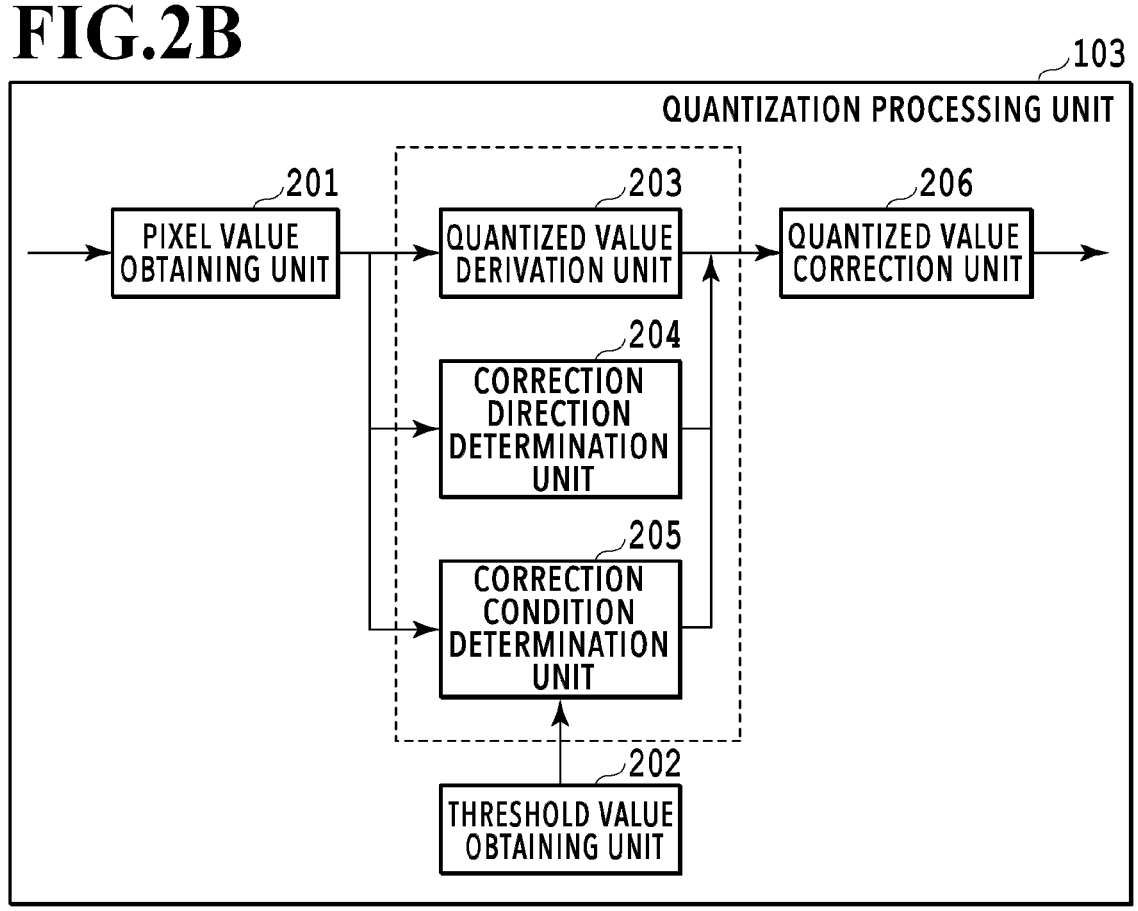

Following the above, details of the quantization processing unit 103 are explained. FIG. 2B is a block diagram showing the internal configuration of the quantization processing unit 103. The quantization processing unit 103 has a pixel value obtaining unit 201, a threshold value obtaining unit 202, a quantized value derivation unit 203, a correction direction determination unit 204, a correction condition determination unit 205, and a quantized value correction unit 206.

In the present embodiment, it is assumed that the data of the image (in the following, simply described as "input image") corresponding to each color plane of CMYK after color separation processing, which is input to the quantization processing unit 103, is 8-bit data in which each pixel indicates a value between 0 and 255. The quantization processing unit 103 converts input image data in which each pixel is represented by eight bits into 1-bit binary halftone image data (image data for printing) in which each pixel has a value of "0" or "1". In the halftone image data, the pixel whose pixel value is "0" represents OFF of the dot and the pixel whose pixel value is "1" represents ON of the dot. The pixel whose dot is OFF is the pixel whose dot is not printed and the pixel whose dot is ON is the pixel whose dot is printed. The halftone image data reproduces the input image data in a pseudo manner by the number of tones smaller than the number of tones represented by the input image data.

Figure 3:
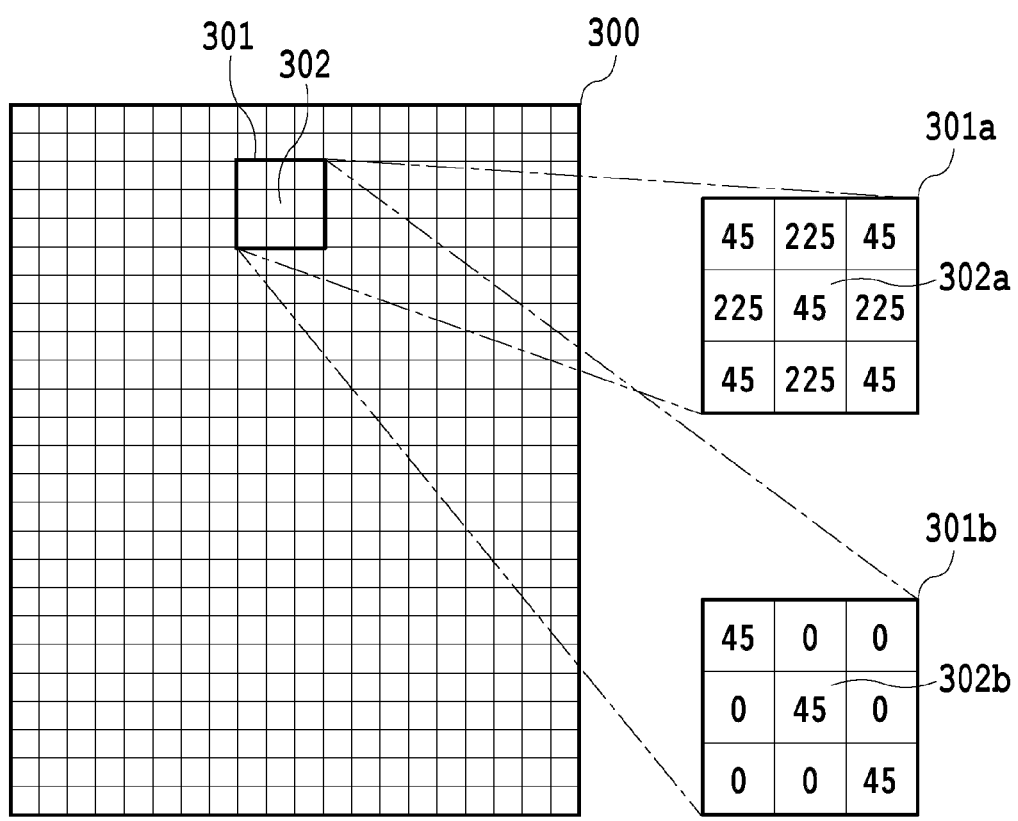
FIG. 3 is a diagram showing an example of an input image.

The pixel value obtaining unit 201 obtains the pixel value of the pixel (in the following, called "pixel of interest") on which attention is focused as a processing target in the input image data and each pixel value of a plurality of pixels constituting a peripheral area (in the following called "reference area") of a predetermined size, including the pixel of interest. In the present embodiment, an area of three pixels× three pixels with the pixel of interest being a center is taken as the reference area. Here, detailed explanation is given with reference to the diagram. FIG. 3 is an example of an input image and the reference area in a case where a pixel 302 in an input image 300 is taken as the pixel of interest is indicated by a thick frame 301. Further, FIG. 3 shows the pixel value of each pixel constituting the reference area 301. In a case of this example, the pixel value obtaining unit 201 obtains each of pixel values (five "45"s and four "225"s) of the nine pixels included in the reference area 301. The obtained data of the pixel value group is provided to the quantized value derivation unit 203, the correction direction determination unit 204, and the correction condition determination unit 205.

Figure 4:
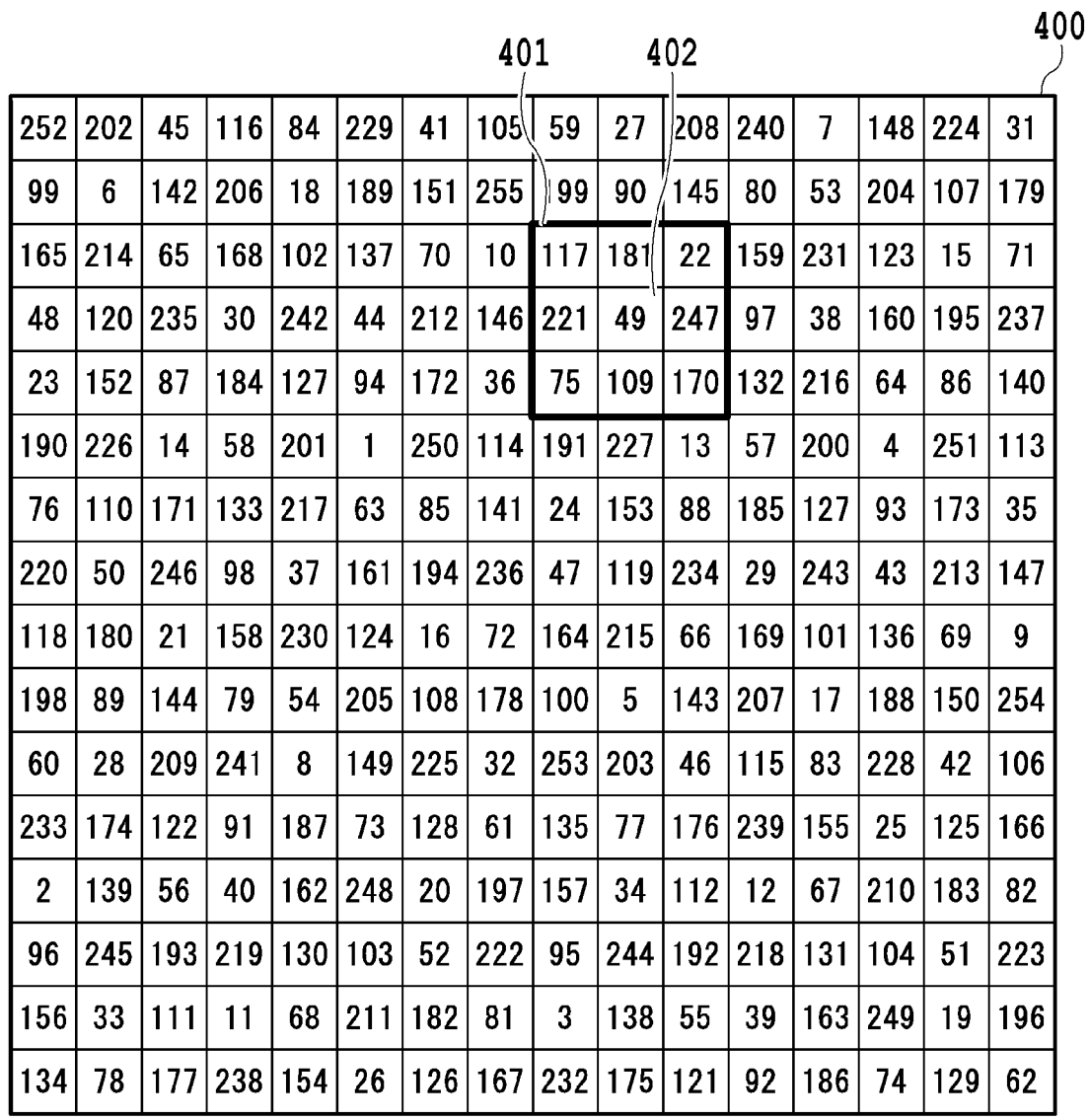
FIG. 4 is a diagram showing an example of a threshold value matrix.

The threshold value obtaining unit 202 obtains the threshold value corresponding to the pixel of interest and each threshold value corresponding to each of the plurality of pixels included in the reference area from the threshold value matrix stored in the RAM 11 or the external storage device 15. FIG. 4 shows an example of the threshold value matrix. In a threshold value matrix 400 shown in FIG. 4, threshold values different from one another are arranged within a matrix of 16×16 size. Details will be described later. The threshold value obtaining unit 202 obtains the threshold value group at the position corresponding to the above-described reference area from the threshold value matrix. In a case where the position indicated by a symbol 402 is the position corresponding to the pixel of interest 302 in the input image 300 in FIG. 3 in the threshold value matrix 400 shown in FIG. 4, nine threshold values within the reference area indicated by a thick frame 401 are obtained. At this time, in a case where the threshold value matrix is smaller than the width of the input image, it is possible to obtain the threshold value group at the position corresponding to the reference area in accordance with each pixel of interest by extending the threshold value matrix in a tiling manner. The obtained data of the threshold value group is provided to the quantized value derivation unit 203, the correction direction determination unit 204, and the correction condition determination unit 205.

The quantized value derivation unit 203 derives a quantized value Q for the pixel of interest by performing processing (dither processing) to compare the pixel value of the pixel of interest and the threshold value at the position corresponding thereto by using a threshold value matrix prepared in advance. In the present embodiment, in a case where the pixel value is larger than the threshold value, the quantized value Q is taken to be "1" and in a case where the pixel value is smaller than or equal to the threshold value, the quantized value Q is taken to be "0". Further, as the threshold value matrix that is used, for example, a threshold value matrix having the blue noise characteristics is conceivable. In the above-described example, the pixel value of the pixel of interest is "45" and the threshold value at the position corresponding thereto is "49" and the pixel value is smaller than or equal to the threshold value, and therefore, the quantized value Q is "0".

The correction direction determination unit 204 determines directionality in a case where dots are increased or decreased in number in the reference area based on the pixel value group in the reference area provided from the pixel value obtaining unit 201 and the threshold value group provided from the threshold value obtaining unit 202. Specifically, in the reference area, a difference value between the "total value of quantized values by the normal quantization processing" and the "total value of quantized values in a case where the quantization processing is performed so that the interference between the pixel value group in the input image and the corresponding threshold value group in the threshold value matrix" is suppressed is found. In this case, the former total value is called a "reference total value" and the latter total value is called a "target total value". Then, in a case where a difference value obtained by subtracting the "reference total value" from the "target total value" is a positive value, this means that it is possible to perform correction of the quantized value in the direction in which dots are increased in number within the reference area because the number of dots is smaller than the target number. On the other hand, in a case where the difference value is a negative value, this means that it is possible to perform correction of the quantized value in the direction in which dots are decreased in number within the reference area because the number of dots exceeds the target number. In the present embodiment, the "target total value" is taken to be the total value of the quantized values obtained by comparing the average value of the pixel value of each pixel in the reference area and the threshold value corresponding to each of the pixels. By comparing the average value, which is the value in which the high-frequency component in the reference area is removed, and each threshold value, it is possible to obtain the target total value in which the interference between the pixel value group of the input image and the corresponding threshold value group is suppressed. Here, how to find the difference value is explained by taking a case as example where a pixel value group 301a in the reference area 301 shown in FIG. 3 is taken as the processing target. First, each of pixel values (45, 225, 45, 225, 45, 225, 45, 225, 45) of the pixel value group 301a and each of threshold values (117, 181, 22, 221, 49, 247, 75, 109, 170) at the corresponding position are compared. As the comparison results, nine quantized values (0, 1, 1, 1, 0, 0, 0. 1, 0) are obtained and the total value of these quantized values, that is "four", is the reference total value. Next, the average value of all the pixel values within the pixel value group 301a is found and the found average value "125" is compared to each of the threshold values (117, 181, 22, 221, 49, 247, 75, 109, 170) at the position corresponding to each pixel. As the comparison results, nine quantized value (1, 0, 1, 0, 1, 0, 1, 1, 0) are obtained and the total value of theses quantized values, that is, "five", is the target total value. As a result of this, a difference value "+1" is obtained by subtracting the reference total value "4" from the target total value "5". As described above, in a case where the difference value is "+1", the number of dots is one smaller than the target number of dots, that is, this means that it is possible to increase dots in number by one within the reference area. The determination results information indicating the directionality of the correction (increase/decrease in the number of dots) of the quantized value for each pixel of interest, which is obtained as described above, is provided to the quantized value correction unit 206 as correction direction information D.

The correction condition determination unit 205 determines whether or not the pixel of interest satisfies a condition for changing the quantized value based on the pixel value group in the reference area provided from the pixel value obtaining unit 201 and the threshold value group provided from the threshold value obtaining unit 202. As described above, in the quantized value derivation processing, in a case where the pixel value is larger than the threshold value, the quantized value is "1", that is, the dot becomes ON. Because of this, the larger the threshold value, the more unlikely that the dot becomes ON and the smaller the threshold value, the more likely that the dot becomes OFF. Consequently, in a case where the threshold value corresponding to the pixel of interest is the largest among the threshold values at the positions at which the dither processing results for each pixel in the reference area are that the dot is ON, it is determined that the pixel of interest is the pixel whose dot can be changed to OFF. In a case where the determination results such as those are obtained, as correction condition information C indicating the condition in a case where the quantized value of the pixel of interest is corrected, a value (here, "−1") indicating that the dot can be changed from ON to OFF is set. Here, at the time of performing determination by taking the ON dot as a target, it may also be possible to limit the comparison-target pixels of interest to those whose pixel value is smaller than a predetermined value (for example, "255", which is the largest value, or the largest value of the pixel values within the reference area). Due to this, it is possible to determine only the pixels whose pixel value is smaller than a predetermined value to be pixels whose dot can be changed to OFF, and therefore, it is made possible to highlight the contrast. Further, in a case where the threshold value corresponding to the pixel of interest is the smallest among the threshold values at the positions at which the dither processing results for each pixel in the reference area are that the dot is OFF, it is determined that the pixel of interest is the pixel whose dot can be changed to ON. In a case where the determination results such as those are obtained, as the correction condition information C indicating the condition in a case where the quantized value of the pixel of interest is corrected, a value (here, "+1") indicating that the dot can be changed from OFF to ON is set. Here, at the time of performing determination by taking the OFF dot as a target, it may also be possible to limit the comparison-target pixels of interest to those whose pixel value is larger than a predetermined value (for example, "0", which is the smallest value, or the smallest value of the pixel values within the reference area). Due to this, it is possible to determine only the pixels whose pixel value is larger than a predetermined value to be pixels whose dot can be changed to ON, and therefore, it is made possible to highlight the contrast. As above, in the present embodiment, based on the threshold value group within the reference area, the pixel whose dot is the most unlikely to become ON is determined to be the pixel whose dot can be changed to OFF and similarly, the pixel whose dot is the most unlikely to become OFF is determined to be the pixel whose dot can be changed to ON. As above, whether or not it is possible to change ON/OFF of the dot in the pixel of interest based on the characteristic of the threshold value group within the threshold value matrix, and therefore, it is made possible to obtain an appropriate dot pattern. Here, by taking a case as an example where the pixel value group 301a in the reference area 301 shown in FIG. 3 is taken as the processing target, the determination of whether or not it is possible to change ON/OFF of the dot in the pixel of interest is explained. Here, the pixel value 302a of the pixel of interest 302 is "45" and the threshold value at the position corresponding thereto is "49", and therefore, the dither processing results are "0" indicating that the dot is OFF. Then, the threshold value "49" is the smallest threshold value among the threshold values at the positions at which the results of dither processing for the pixel value group 301a in the reference area 301 are that the dot is OFF. Consequently, the pixel of interest 302 is determined to be the pixel whose dot can be changed to ON and as the correction condition information C, "+1" is set. The correction condition information C indicating the correction condition of the quantized value for each pixel of interest, which is thus obtained, is provided to the quantized value correction unit 206.

The quantized value correction unit 206 corrects the quantized value of the pixel of interest as needed based on the quantized value Q by the quantized value derivation unit 203, the correction direction information D by the correction direction determination unit 204, and the correction condition information C by the correction condition determination unit 205. Then, the corrected quantized value is output as the final quantization processing results (1=dot is ON, 0=dot is OFF) for the pixel of interest.

(Flow of Quantization Processing)

Next, the operation of a quantization processing unit 104 of the present embodiment is explained with reference to the flowcharts in FIGS. 5A and 5B. In the following explanation, symbol "S" means a step.

At S501, a pixel of interest is determined among all the pixels within the input image. At S502 that follows, the pixel value obtaining unit 201 obtains the pixel value of the pixel of interest determined at S501 and the pixel value group of a plurality of pixels included in the reference area including the pixel of interest. Further, at S503, the threshold value obtaining unit 202 refers to the threshold value matrix and obtains the threshold value corresponding to the pixel of interest and the threshold value group corresponding to the plurality of pixels included in the reference area.

Next, at S504, the quantized value derivation unit 203 derives the quantized value Q for the pixel of interest by comparing the pixel value of the pixel of interest obtained at S502 and the corresponding threshold value obtained at S503.

Next, at S505, the correction direction determination unit 204 determines directionality in a case where the quantized value of the pixel of interest is corrected based the pixel value group in the reference area, which is obtained at S502, and the corresponding threshold value group obtained at S503. Then, the correction direction determination unit 204 generates the correction direction information D in accordance with the determination results.

Next, at S506, the correction condition determination unit 205 determines whether or not it is possible to change the dot in the pixel of interest to ON or OFF based on the pixel value group in the reference area, which is obtained at S502, and the threshold value group obtained at S503. Then, the correction condition determination unit 205 generates the correction condition information C in accordance with the determination results.

Each step of S507 and subsequent steps is the processing for the quantized value correction unit 206 to determine to output the quantized value of the pixel of interest by the value indicating that the dot is ON or by the value indicating that the dot is OFF based on the quantized value Q about the pixel of interest, the correction direction information D, and the correction condition information C.

First, at S507, whether or not the quantized value Q of the pixel of interest is "1" indicating that the dot is ON is determined. In a case where the quantized value Q=1, the processing advances to S508 and in a case where the quantized value Q=0, the processing advances to S512.

At S508, whether or not the value of the correction direction information D about the pixel of interest is a negative value (D<0) meaning the decreasing direction is determined. In a case where the value of the correction direction information D is a negative value, the processing advances to S509 and in a case where the value is not a negative value (0 or lager), the processing advances to S511.

At S509, whether or not the value of the correction condition information C about the pixel of interest is "−1" indicating that it is possible to change the dot to OFF is determined. In a case where the value of the correction condition information C is "−1", the processing advances to S510 and in the other case (case of "+1"), the processing advances to S511.

At S510, the quantized value Q derived at S504 for the pixel of interest is changed from "1" indicating that the dot is ON to "0" indicating that the dot is OFF and the changed value is output as the final quantization results. On the other hand, at S511, the quantized value Q derived at S504 for the pixel of interest is kept at "1" indicating that the dot is ON and the value is output as the final quantization results.

At S512, whether or not the value of the correction direction information D about the pixel of interest is a positive value (D≥1) meaning the increasing direction is determined. In a case where the value of the correction direction information D is a positive value, the processing advances to S513 and in a case where it is not a positive value (zero or less), the processing advances to S515.

At S513, whether or not the value of the correction condition information C about the pixel of interest is "+1" indicating that it is possible to change the dot to ON is determined. In a case where the value of the correction condition information C is "+", the processing advances to S514 and in the other case (case of "−1"), the processing advances to S515.

At S514, the quantized value Q derived at S504 for the pixel of interest is changed from "0" indicating that the dot is OFF to "1" indicating that the dot is ON and the changed value is output as the final quantization results. On the other hand, at S515, the quantized value Q derived at S504 for the pixel of interest is kept at "0" indicating that the dot is OFF and the value is output as the final quantization results.

By the processing as above, the output value for each pixel of interest is determined. To give explanation by taking a case as an example where the pixel value group 301 in FIG. 3 and the threshold value group 401 in FIG. 4, which corresponds to the pixel value group 301, are taken as the processing target, the processing results at S504 to S506 for the pixel of interest 302 are as follows.

quantized value Q=0
correction direction information D=1
correction condition information C=1

Consequently, at S507, the determination results are NO, at S512 that follows, they are YES, and at next S513, they are YES, and therefore, the final quantization results of the pixel of interest 302 are "1" indicating that the dot is ON.

Lastly, at S516, whether or not the above-described processing is completed for all the pixels within the input image is determined. In a case where there is an unprocessed pixel, the processing returns to S501, and the next pixel of interest is determined and the processing is continued. On the other hand, in a case where the processing of all the pixels is completed, this processing is terminated.

The above is the contents of the processing process in the quantization processing unit 103 according to the present embodiment. In the flow shown in FIGS. 5A and 5B, in a case where the value of the correction direction information D is "0", the quantization results at S504 are output as they are, and therefore, it is possible to obtain a dot pattern whose sharpness is good. In the flow shown in FIG. 5A, after determining whether or not it is possible to change ON/OFF of the dot in advance at S506, whether to change the dot to ON or OFF is determined based on the determination results. However, the method is not limited to the method such as this. It may also be possible to determine whether or not it is possible to change the dot to ON/OFF in response to that the determination results at S508 and S512 are YES. In this case, on a condition that the determination results at S508 and S512 are NO, it is not necessary to perform the determination of whether or not it is possible to change the dot to ON/OFF, and therefore, it is possible to reduce the processing load.

Modification Example 1

Figure 5A:
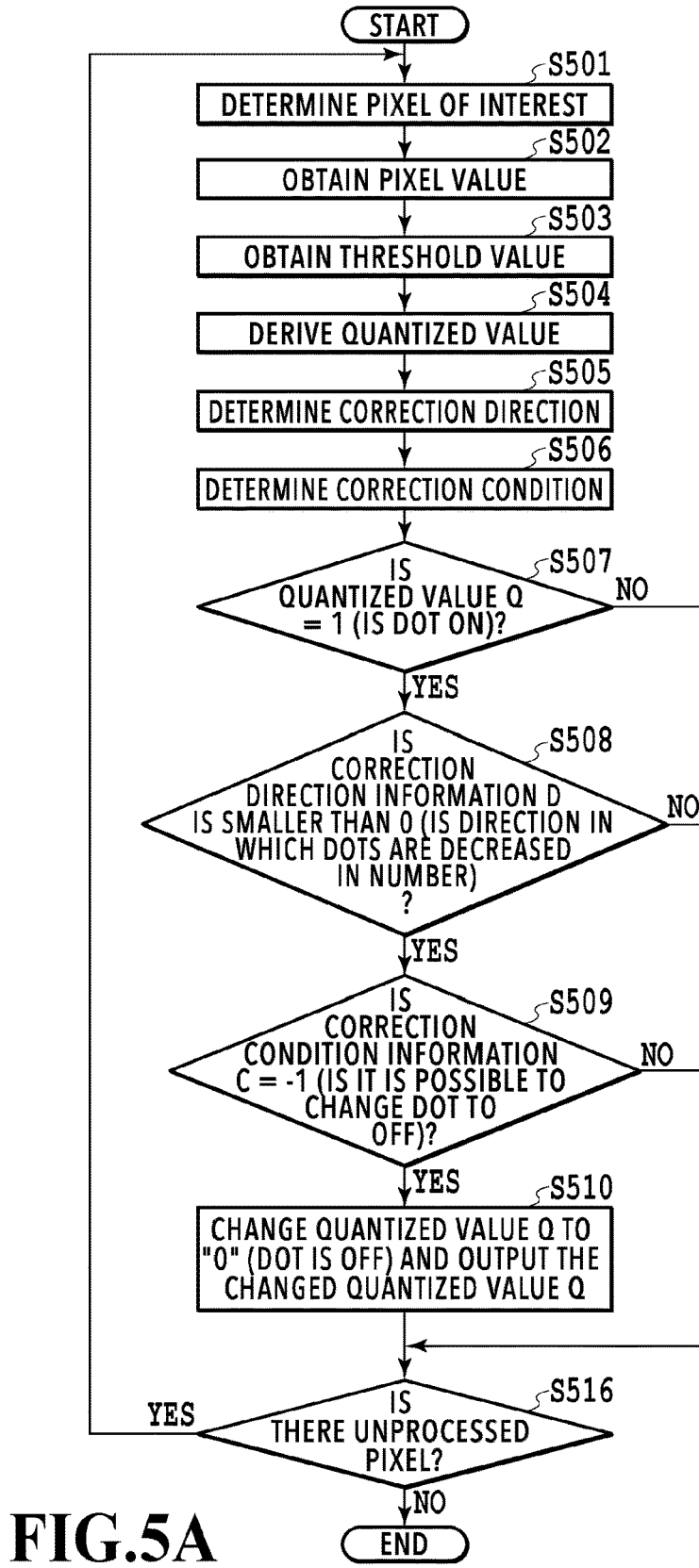
FIG. 5 is a diagram showing a relationship between FIGS. 5A and 5B, and FIGS. 5A and 5B are flowcharts showing a flow of the operation of the quantization processing unit.
Figure 5B:
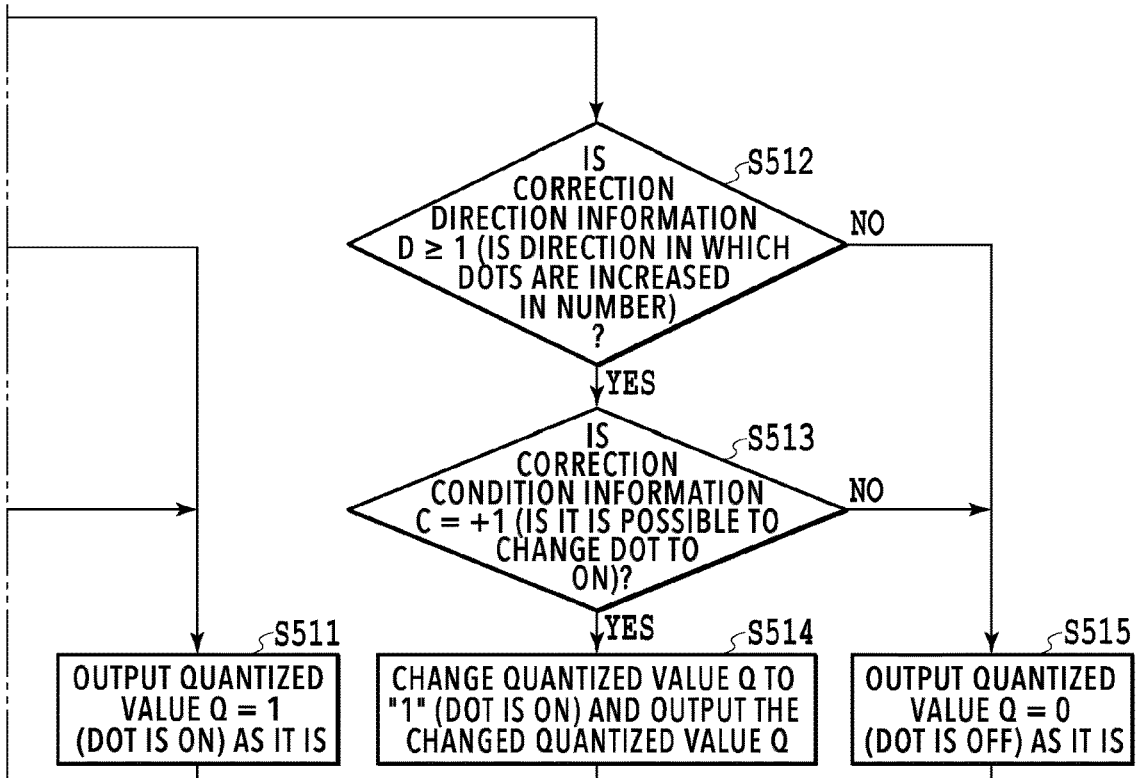
Figure 6B:
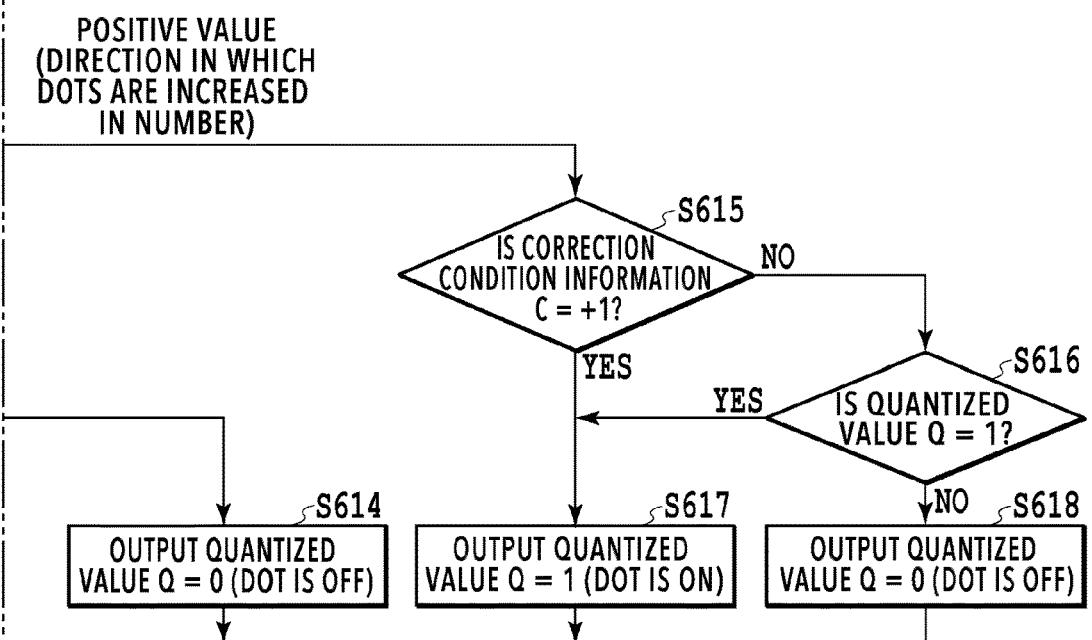
FIG. 6 is a diagram showing a relationship between FIGS. 6A and 6B, and FIGS. 6A and 6B are flowcharts showing a flow of the operation of the quantization processing unit.

In the flow in FIG. 5A, after each of the processing in the quantized value derivation unit 203, the correction direction determination unit 204, and the correction condition determination unit 205 is completed, the processing is branched first (S507) in accordance with the quantized value Q derived by the quantized value derivation unit 203. Next, an aspect is explained as a modification example 1 of the present embodiment, in which branching of processing in accordance with the correction direction information D generated by the correction direction determination unit 204 is performed first. FIGS. 6A and 6B are flowcharts showing a flow of quantization processing according to the present modification example. In the following, explanation is given along the flowchart in FIGS. 6A and 6B. Each step of S601 to S606 corresponds to each of S501 to S506 respectively in the flowchart in FIG. 5A described previously and there is no difference in particular, and therefore, explanation is omitted and each step of S607 and subsequent steps that are performed by the quantized value correction unit 206 is explained.

First, at S607, whether the value of the correction direction information D about the pixel of interest is a positive value, a negative value, or the other ("0") is determined. In a case where the value of the correction direction information D is a negative value indicating the decreasing direction, the processing advances to S608. Further, in a case where the value of the correction direction information D is "0" indicating the maintenance of the current state, the processing advances to S612. Furthermore, in a case where the value of the correction direction information D is a positive value indicating the increasing direction, the processing advances to S615.

At S608, whether or not the value of the correction condition information C about the pixel of interest is "−1" indicating that it is possible to change the dot to OFF is determined. In a case where the value of the correction condition information C is "−1", the processing advances to S610 and in the other case (case of "+1"), the processing advances to S609.

At S609, whether or not the value of the quantized value Q about the pixel of interest is "1" indicating that the dot is ON is determined. In a case where the value of the quantized value Q is "1", the processing advances to S611 and in the other case (case of "0" indicating that the dot is OFF), the processing advances to S610.

At S610, the final quantized value about the pixel of interest is determined to be "0" indicating that the dot is OFF and "0" is output. Further, at S611, the final quantized value about the pixel of interest is determined to be "1" indicating that the dot is ON and "1" is output.

At S612, as at S609 described above, whether or not the value of the quantized value Q about the pixel of interest is "1" indicating that the dot is ON is determined. In a case where the value of the quantized value Q is "1", the processing advances to S613 and in the other case (case of "0" indicating that the dot is OFF), the processing advances to S614.

At S613, the final quantized value about the pixel of interest is determined to be "0" indicating that the dot is OFF and "0" is output. Further, at S614, the final quantized value about the pixel of interest is determined to be "1" indicating that the dot is ON and "1" is output.

At S615, whether or not the value of the correction condition information C about the pixel of interest is "+1" indicating that it is possible to change the dot to ON is determined. In a case where the value of the correction condition information C is "+1", the processing advances to S617 and in the other case (case of "−1"), the processing advances to S616.

At S616, whether or not the value of the quantized value Q about the pixel of interest is "1" indicating that the dot is ON is determined. In a case where the value of the quantized value Q is "1", the processing advances to S617 and in the other case (case of "0" indicating that the dot is OFF), the processing advances to S618.

At S617, the final quantized value about the pixel of interest is determined to be "1" indicating that the dot is ON and "1" is output. Further, at S618, the final quantized value about the pixel of interest is determined to be "0" indicating that the dot is OFF and "0" is output.

Lastly, at S619, whether or not the above-described processing is completed for all the pixels within the input image is determined. In a case where there is an unprocessed pixel, the processing returns to S601, and the next pixel of interest is determined and the processing is continued. On the other hand, in a case where the processing of all the pixels is completed, this processing is terminated.

The above is the contents of the processing in the quantization processing unit 103 according to the present modification example. By the processing process such as this as well, it is made possible to obtain a halftone image including a dot pattern equivalent to that in a case where the processing is performed in accordance with the flow in FIGS. 5A and 5B.

Modification Example 2

In the flows in FIGS. 5A and 5B and FIGS. 6A and 6B, it is determined that only the pixel whose dot is the most unlikely to become ON within the reference area is the pixel whose dot can be changed to OFF and only the pixel whose dot is the most unlikely to become OFF within the reference area is the pixel whose dot can be changed to ON. However, the application range of the present embodiment is not limited to this.

For example, the difference value in a case where the target total value calculated by the correction direction determination unit 204 is "6" and the reference total value is "4" is "+2". Consequently, an absolute value N of the correction direction information D is "2". In this case, among threshold values corresponding to pixels whose quantized value is "0", even on a condition that the threshold value corresponding to the pixel of interest is the second (Nth) smallest threshold value, the pixel of interest is determined to be the pixel whose dot can be changed to ON. Similarly, the difference value in a case where the target total value calculated by the correction direction determination unit 204 is "4" and the reference total value is "6" is "−2". Consequently, the absolute value N of the correction direction information D is "2". In this case, among the threshold values corresponding to the pixels whose quantized value is "1", even on a condition that the threshold value corresponding to the pixel of interest is the second (Nth) largest threshold value, the pixel of interest is determined to be the pixel whose dot can be changed to OFF.

As above, in accordance with the magnitude (that is, the absolute value N of the correction direction information D) of the difference between the target total value and the reference total value, it may be possible to determine that it is possible to change the dot of the pixel of interest to ON or OFF.

Further, in the above-described modification example, it may also be possible to take the reference total value as "0" at all times and take the target total value itself as the correction direction information D. In this case, the absolute value N of the correction direction information D=the target total value, and therefore, the value of the correction direction information D is "0" or more at all times. Consequently, in the determination of whether or not it is possible to change the dot of the pixel of interest to ON/OFF, it is sufficient to perform the only determination in the direction in which dots are is increased in number, and therefore, it is possible to simplify the processing.

As above, according to the present embodiment including the above-described modification examples, it is possible to obtain a halftone image having a good dot pattern based the quantized value, in which the interference between the pixel value group of the input image and the threshold value group of the corresponding threshold value matrixes is suppressed.

Second Embodiment

With the method of the first embodiment, a halftone image of high quality in which the moire that is caused by the interference between the feature represented by the input image and the characteristic of the threshold value matrix applied is suppressed is obtained, but on the other hand, in a case where a light thin line is included within the input image, there is a possibility that the light thin line is lost. Here, the light thin line means a line having a light tone and a thin width on a white background. In the reference area including only the light thin line, the average value of the pixel value of each pixel constituting the reference area is small and the value of the target total value (target number of dots) that is calculated at the time of determination of the correction direction becomes small. Because of this, a sufficient number of dots is not arranged and as a result of this, the light thin line is lost or visual recognizability thereof deteriorates. Consequently, an aspect is explained as a second embodiment in which even in a case where a bright thin line or a outlined dark thin line is included in an input image, the visual recognizability thereof is prevented from deteriorating. In the following, explanation is given by narrowing the explanation to the processing contents of the correction direction determination unit 204 and the correction condition determination unit 205, which are points different from those of the first embodiment. Further, in explanation, for convenience of distinction from the first embodiment, the correction direction determination unit 204 and the correction condition determination unit 205, respectively, are described as a "correction direction determination unit 204'" and a "correction condition determination unit 205'". Further, the flow itself of the quantization processing is the same as that of the first embodiment, and therefore, explanation is given along the flowcharts in FIGS. 5A and 5B and FIGS. 6A and 6B described previously.

(Processing Contents of Correction Direction Determination Unit)

First, an outline of processing in the correction direction determination unit 204' is explained. As in the first embodiment, the correction direction determination unit 204' determines directionality in a case where dots are increased or decreased in number in the reference area based on the pixel value group in the reference area, which is provided from the pixel value obtaining unit 201, and the threshold value group provided from the threshold value obtaining unit 202. The difference from the first embodiment lies in the method of finding the target total value in a case where the reference area is an image area (in the following, called "light thin line image") including a light thin line. In a case of the present embodiment, the "total value of quantized values in a case where quantization processing is performed so as to suppress the lost of the light thin line" in the reference area is taken as the target total value. Then, correction direction information (for convenience of distinction from the first embodiment, described as "correction direction information D'") is generated, with which the reference total value, which is the "total value of quantized values by the normal quantization processing", becomes close to the above-described target total value in the reference area. In the following, more detailed explanation is given.

In the determination processing of the correction direction at S505 in the flow in FIG. 5A (S605 in the flow in FIG. 6A), the correction direction determination unit 204' first performs detection processing of a white pixel (pixel value=0) for the reference area including the pixel of interest. In a case where a white pixel is detected in the reference area, it is determined that the reference area is a light thin line image. The determination method of whether the reference area is a light thin line image is not limited to this. In a case where the reference area is larger than three pixels×three pixels, on a condition that the pixel of interest is adjacent to a white pixel, it is possible to determine that the reference area is alight thin line image. Alternatively, in a case where the total value of the quantized values derived from the comparison between the average value of the pixel values in the reference area and the threshold value corresponding to each pixel is "0", it is possible to determine that the reference area is a light thin line image.

Next, for the reference area determined to be a light thin line area, the reference total value and the target total value are calculated. Here, as the target total value, the total value of the quantized values derived from the comparison between the pixel value of the pixel of interest and the threshold value corresponding to each pixel is taken. That is, in a case of the present embodiment, averaging of the pixel values is not performed within the reference area, and therefore, the target total value that is calculated does not become small (the target number dots does not decrease), and therefore, it is possible to obtain the target total value capable of suppressing the loss of a light thin line. Further, as another calculation method, it may also be possible to find the total value of the quantized values derived from the comparison between the largest value of the pixel value within the reference area determined to be a light thin line image and the threshold value corresponding to each pixel and take this total value as the target total value.

For the reference area in which no white pixel is detected (=non-light thin line image), it may be possible to calculate the target total value by the method described in the first embodiment.

Then, by subtracting the reference total value from the target total value obtained as described above, the correction direction information D' is found. Here, by taking a case as an example where the pixel value group 301b in the reference area 301 shown in FIG. 3 is taken as the processing target, how to find the correction direction information D' is explained. Here, in the pixel value group 301b, the smallest pixel value "0" is included. Consequently, it is determined that the reference area 301 is a light thin line image. Further, by the comparison between each of the pixel values (45, 0, 0, 0, 45, 0, 0, 0, 45) within the pixel value group 301b and each of the corresponding values (117, 181, 22, 221, 49, 247, 75, 109, 170), quantized values (0, 0, 0, 0, 0, 0, 0, 0, 0) are found. Then, the total value "0" is taken as the reference total value. Further, by the comparison between the pixel value "45" of the pixel of interest and each of the threshold values (117, 181, 22, 221, 49, 247, 75, 109, 170) corresponding to each pixel, quantized values (0, 0, 1, 0, 0, 0, 0, 0, 0) are found. Then, the total value "1" is taken as the target total value. Lastly, by the difference obtained by subtracting the reference total value "0" from the target total value "1", the correction direction information D' is "+1" indicating that it may be possible to increase dots in number.

(Processing Contents of Correction Condition Determination Unit)

Next, an outline of processing in the correction condition determination unit 205' is explained. As in the first embodiment, the correction condition determination unit 205' determines whether or not it is possible to change the dot in the pixel of interest to ON or OFF based on the pixel value group in the reference area provided from the pixel value obtaining unit 201 and the threshold value group provided from the threshold value obtaining unit 202. The difference from the first embodiment lies in that a difference reference is used for the determination of whether or not it is possible to change the dot in the pixel of interest to ON or OFF. In the following, detailed explanation is given.

In processing to determine whether or not it is possible to change the dot to ON/OFF at S506 in the flow in FIG. 5A (S606 in the flow in FIG. 6A), the correction condition determination unit 205' first performs detection processing of a white pixel (pixel value=0) for the reference area including the pixel of interest as in the case of the correction direction determination unit 204'. In a case where a white pixel is detected in the reference area, it is determined that the reference area is a light thin line image.

Next, for the reference area determined to be a light thin line image, among threshold values at the positions at which the results of the dither processing for each pixel within the reference area are that the dot is ON and which correspond to pixels whose pixel value is not the smallest value, whether the threshold value corresponding to the pixel of interest is the smallest is determined. Then, in a case where the threshold value corresponding to the pixel of interest is the smallest among those threshold values, it is determined that the pixel of interest is a pixel whose dot can be changed to ON and as correction condition information C', a value of "+1" is set, which indicate that it is possible to change the dot to ON.

Here, by taking a case as an example where the pixel value group 301b in the reference area 301 shown in FIG. 3 is taken as the processing target, how to find the correction condition information C' is explained. Here, in the pixel value group 301b, each pixel value is smaller than its corresponding threshold value. Consequently, the quantized value in a case where the normal quantization processing is performed is "0" indicating that the dot is OFF for each pixel. Then, the threshold value "49" corresponding to the pixel of interest 302 is the smallest threshold value in the threshold value group 401. Further, in the pixel value group 301b, the threshold values corresponding to the three pixels whose pixel values is not the smallest value (=0) are "117", "49", and "170" respectively and "49" is the smallest threshold value among them. Consequently, it is determined that the pixel of interest 302 is the pixel whose dot can be changed to ON and as the correction condition information C', a value of "1" is set, which indicates that it is possible to change the dot to ON.

In order to determine whether it is possible to change the ON dot in the pixel of interest to an OFF dot, it is sufficient to perform the determination by using the same reference as that in the first embodiment. Further, for the reference area in which no white pixel is detected (=non-light thin line image) also, it is sufficient to determine whether or not it is possible to change the dot to ON/OFF by the method described in the first embodiment.

As above, in the present embodiment, in a case where the reference area is a light thin line image, the correction condition information C' that suppress the loss of a light thin line is generated for the pixel of interest. Then, based on the corresponding threshold value group, whether or not it is possible to change the dot in the pixel of interest to ON or OFF is determined. Due to this, a halftone image having a dot pattern in which the loss of a light thin line is suppressed is obtained.

Modification Example

It is also possible to apply the contents of the above-described processing that takes a light thin line as the target to a outlined dark thin line. Here, outlined dark thin line means a line having a dark tone and a thin width on a black background. In the reference area including a outlined dark thin line, the average value of the pixel value of each pixel constituting the reference area is large and the value of the calculated target total value is large. Because of this, there is a case where dots are arranged more than necessary and the visual recognizability of a outlined dark thin line is deteriorated. In a case of a outlined dark thin line, it is sufficient to perform processing as follows.

First, in place of the detection processing of a white pixel, detection processing of a black pixel (pixel value=255) is performed within the reference area including the pixel of interest. In a case where a black pixel is detected in the reference area, it is determined that the reference area is a outlined dark thin line image. The method of determining whether the reference area is a outlined dark thin line image is not limited to this. In a case where the reference area is larger than three pixels×three pixels, on a condition that a black pixel adjacent to the pixel of interest, it is possible to determine that the reference area is a outlined dark thin line image. Alternatively, in a case where the total value of the quantized values derived from the comparison between the average value of the pixel values in the reference area and the threshold value corresponding to each pixel is "9", which is equal to the number of pixels in the reference image, it is possible to determine that the reference area is a solid pale white line image.

Then, in a case where it is determined that the reference area is a outlined dark thin line image, first, by the same method as in the case of the light thin line image, the target total value and the reference total value are calculated and the correction direction information D' is found. Further, the correction condition information C' is found as follows.

First, among threshold values at the positions at which the results of the dither processing for each pixel within the reference area determined to be a outlined dark thin line image are the value indicating that the dot is ON and which correspond to the pixels whose pixel value is not the largest value, whether the threshold value corresponding to the pixel of interest is the largest is determined. Then, in a case where the threshold value corresponding to the pixel of interest is the largest among those threshold values, it is determined that the pixel of interest is a pixel whose dot can be changed to OFF and as the correction condition information C', a value of "−1" is set, which indicates that it is possible to change the dot to OFF. In this manner, it is possible to obtain the correction condition information C' that suppresses the loss of a outlined dark thin line. In order to determine whether it is possible to change the OFF dot in the pixel of interest to an ON dot, it is sufficient to perform the determination by using the same reference as that of the first embodiment. Further, for the reference area in which no black pixel is detected (=non-outlined dark thin line image) also, it is sufficient to determine whether or not it is possible to change the dot to ON/OFF by the method described in the first embodiment.

Other Embodiments

It is possible to implement the present invention also by processing to supply programs implementing one or more functions of the above-described embodiments to a system or an apparatus via a network or a storage medium and cause one or more processors in a computer of the system or the apparatus to read and execute the programs. Further, it is also possible to implement the present invention by a circuit (for example, ASIC) that implements one or more functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, it is possible to convert a digital image into a halftone image of a higher quality.

The invention claimed is:

1. An image processing device that generates a halftone image by performing quantization processing for an input image, the device comprising:
  a processor; and
  a memory, including instructions stored thereon, which, when executed by the processor, cause the image processing device to:
    derive a quantized value corresponding to a pixel of interest in the input image by using a threshold value matrix;
    perform a first determination relating to correction for the quantized value based on a pixel value group in a reference area including the pixel of interest in the input image and a threshold value group corresponding to the pixel value group in the threshold value matrix;
    perform a second determination relating to whether or not the pixel of interest satisfies a predetermined condition for changing the quantized value based on the pixel value group and the threshold value group; and
    correct the quantized value based on determination results of the first determination and determination results of the second determination.

2. The image processing device according to claim 1, wherein the first determination performs determination relating to an increase/decrease direction of the correction for making a number of dots in a reference area a target number.

3. The image processing device according to claim 1, wherein the first determination:

calculates an average value of a pixel value of each pixel included in the reference area;
finds a first total value indicating a target number based on results of comparison between the calculated average value and a threshold value corresponding to each pixel included in the reference area;
finds a second total value indicating a number of dots in the reference area based on results of comparison between the pixel value of each pixel included in the reference area and the threshold value corresponding to each pixel included in the reference area; and
performs the determination relating to the correction based on a difference between the first total value and the second total value.

4. The image processing device according to claim 3, wherein the first determination:
  determines that it is possible to correct the quantized value so that in which dots is increased in number within the reference area in a case where a value obtained by subtracting the second total value from the first total value is a positive value; and
  determines that it is possible to correct the quantized value so that in which dots is decreased in number within the reference area in a case where the value obtained by subtracting the second total value from the first total value is a negative value.

5. The image processing device according to claim 3, wherein the second determination:
  refers to an absolute value N of the difference;
  determines that the pixel of interest is a pixel that can be changed to a pixel whose dot is not printed, whose threshold value is larger than or equal to an Nth largest threshold value among threshold values with which, results of comparison between the pixel value of each pixel included in the reference area and the threshold value corresponding to each pixel included in the reference area are a value indicating that the dot is printed; and
  determines that the pixel of interest is a pixel that can be changed to a pixel whose dot is printed, whose threshold value is smaller than or equal to an Nth smallest threshold value among threshold values with which, results of comparison between the pixel value of each pixel included in the reference area and the threshold value corresponding to each pixel included in the reference area are a value indicating that the dot is not printed.

6. The image processing device according to claim 1, wherein in a case where the reference area is an image area including a light thin line, the first determination:
  finds a first total value indicating a target number based on results of comparison between the pixel value of the pixel of interest and each pixel included in the reference area;
  finds a second total value indicating a number of dots in the reference area based on results of comparison between the pixel value of each pixel included in the reference area and the threshold value corresponding to each pixel included in the reference area; and
  performs the determination relating to the correction based on a difference between the first total value and the second total value.

7. The image processing device according to claim 6, wherein the case where the reference area is an image area including a light thin line is a case where a white pixel is adjacent to the pixel of interest, a case where the white pixel is detected from within the reference area, or a case where the first total value is 0.

8. The image processing device according to claim 1, wherein in a case where the reference area is an image area including an outlined dark thin line, the first determination:
finds a first total value indicating a target number based on results of comparison between a pixel value of the pixel of interest and each pixel included in the reference area;
finds a second total value indicating a number of dots in the reference area based on results of comparison between the pixel value of each pixel included in the reference area and a threshold value corresponding to each pixel included in the reference area; and
performs a determination relating to the correction based on a difference between the first total value and the second total value.

9. The image processing device according to claim 8, wherein the case where the reference area is an image area including an outlined dark thin line is a case where a white pixel is adjacent to the pixel of interest, a case where a black pixel is detected from within the reference area, or a case where the first total value is equal to a number of pixels in the reference area.

10. The image processing device according to claim 1, wherein the second determination:
determines that a pixel of interest is a pixel that can be changed to a pixel whose dot is not printed in a case where among threshold values with which, results of comparison between the pixel value of each pixel included in the reference area and a threshold value corresponding to each pixel included in the reference area are a value indicating that a dot is printed, the threshold value of the pixel of interest is the largest threshold value, and
determines that the pixel of interest is a pixel that can be changed to a pixel whose dot is printed in a case where among threshold values with which, results of comparison between the pixel value of each pixel included in the reference area and the threshold value corresponding to each pixel included in the reference area are a value indicating that the dot is not printed, the threshold value of the pixel of interest is the smallest value.

11. The image processing device according to claim 10, wherein the second determination:
limits, in a case of determining whether not it is possible to change a pixel of interest to a pixel whose dot is not printed, the target pixels of interest to those whose pixel value is smaller than a predetermined value; and
limits, in a case of determining whether or not it is possible to change a pixel of interest to a pixel whose dot is not printed, the target pixels of interest to those whose pixel value is larger than a predetermined value.

12. The image processing device according to claim 1, wherein
the second determination determines that the pixel of interest is a pixel that can be changed to a pixel whose dot is printed in a case where among threshold values with which, results of comparison between a pixel value of each pixel included in the reference area and a threshold value corresponding to each pixel included in the reference area are a value indicating that the dot is not printed and threshold values corresponding to the pixels whose pixel values are not the smallest value, the threshold value of the pixel of interest is the smallest value.

13. The image processing device according to claim 1, wherein
the second determination determines that the pixel of interest is a pixel that can be changed to a pixel whose dot not is printed in a case where among threshold values with which, results of comparison between a pixel value of each pixel included in the reference area and the threshold value corresponding to each pixel included in the reference area are a value indicating that a dot is printed and the threshold values corresponding to the pixels whose pixel values are not the largest value, the threshold value of the pixel of interest is the largest.

14. The image processing device according to claim 1, wherein the instructions, when executed by the processor, further cause the image processing device to:
correct the quantized value to a value indicating that a dot is printed in a case where the first determination determines that it is possible to correct the quantized value in a direction in which dots are increased in number within a reference area and the second determination determines that it is possible to change the pixel of interest to a pixel whose dot is printed; and
corrects the quantized value to a value indicating that the dot is not printed in a case where the first determination determines that it is possible to correct the quantized value in a direction in which dots are decreased in number within the reference area and the second determination determines that it is possible to change the pixel of interest to a pixel whose dot is not printed.

15. An image processing method of generating a halftone image by performing quantization processing for an input image, the method comprising:
deriving a quantized value corresponding to a pixel of interest in the input image by using a threshold value matrix;
performing a first determination relating to correction for the quantized value based on a pixel value group in a reference area including the pixel of interest in the input image and a threshold value group corresponding to the pixel value group in the threshold value matrix;
performing a second determination relating to whether or not the pixel of interest satisfies a predetermined condition for changing the quantized value based on the pixel value group and the threshold value group; and
correcting the quantized value based on determination results at the first determination and determination results at the second determination.

16. A non-transitory computer readable storage medium storing a program for causing a computer to perform an image processing method of generating a halftone image by performing quantization processing for an input image, the method comprising:
deriving a quantized value corresponding to a pixel of interest in the input image by using a threshold value matrix;
performing a first determination relating to correction for the quantized value based on a pixel value group in a reference area including the pixel of interest in the input image and a threshold value group corresponding to the pixel value group in the threshold value matrix;
performing a second determination relating to whether or not the pixel of interest satisfies a predetermined condition for changing the quantized value based on the pixel value group and the threshold value group; and correcting the quantized value based on determination results at the first determination and determination results at the second determination.

\* \* \* \* \*